United States Patent
Arimitsu et al.

(10) Patent No.: US 6,844,699 B2
(45) Date of Patent: Jan. 18, 2005

(54) CURRENT DETECTION DEVICE

(75) Inventors: Minoru Arimitsu, Yokosuka (JP); Shouichi Maeda, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 297 days.

(21) Appl. No.: 10/190,578

(22) Filed: Jul. 9, 2002

(65) Prior Publication Data

US 2003/0011255 A1 Jan. 16, 2003

(30) Foreign Application Priority Data

Jul. 9, 2001 (JP) .................................... 2001-207633

(51) Int. Cl.⁷ ................................................ H02P 7/42
(52) U.S. Cl. ........................ 318/801; 318/154; 318/721; 318/802
(58) Field of Search ............................... 318/801, 721, 318/802, 154

(56) References Cited

U.S. PATENT DOCUMENTS

| 6,049,152 A | * | 4/2000 | Nakano | .................. 310/114 |
|---|---|---|---|---|
| 6,232,741 B1 | | 5/2001 | Saitou et al. | .................. 318/701 |
| 6,335,606 B1 | * | 1/2002 | Minagawa et al. | .......... 318/801 |
| 6,639,337 B1 | * | 10/2003 | Nakano | ...................... 310/113 |
| 6,710,492 B2 | * | 3/2004 | Minagawa | .................. 310/113 |

FOREIGN PATENT DOCUMENTS

| EP | 1 087 518 A2 | 3/2001 |
|---|---|---|
| JP | 11-275826 A | 10/1999 |
| JP | 11-356100 A | 12/1999 |
| JP | 2000-048996 A | 2/2000 |
| JP | 2001-103717 A | 4/2001 |

* cited by examiner

*Primary Examiner*—Rita Leykin
(74) *Attorney, Agent, or Firm*—Foley & Lardner LLP

(57) ABSTRACT

A current detection device used for a plurality of rotating electric machines is provided. The rotating electric machines are supplied with a composite current containing a plurality of frequency components from an single inverter and the frequency is set in response to the rotational angular velocity of one rotating electric machine. The current detection device is provided with a current sensor which detects only current components at a single frequency in the composite current. The current sensor detects the currents in a set of supply lines, the supply lines of which being collected and passing through the current sensor so that the current components of the frequency different from the single frequency cancel out to zero in the set of supply lines.

9 Claims, 5 Drawing Sheets

US 6,844,699 B2

CURRENT DETECTION DEVICE

FIELD OF THE INVENTION

This invention relates to a device for detecting the currents of a plurality of rotating electric machines.

BACKGROUND OF THE INVENTION

When supplying current to the stator of a rotating electric machine through a supply line from an inverter, the current flowing in the supply line is detected by providing a current sensor in the supply line.

U.S. Pat. No. 6,049,152 issued to Masaki Nakano on 11 Apr. 2000 discloses a composite motor provided with a plurality of rotating electric machines controlled by a single inverter. The single inverter supplies the composite motor with a composite current containing a plurality of current components having their respective frequencies. The respective frequency of the current component is determined in response to the rotational frequency of each rotating electric machine.

SUMMARY OF THE INVENTION

It is an object of this invention to perform separate detection of the current components with their respective frequencies constituting a composite current when a plurality of rotating electric machines are controlled by a single inverter.

In order to achieve above object, this invention provides a current detection device for use in an electric rotating system, the system having a first rotor, a second rotor, and a single inverter for supplying a composite current which is a combination of a first current component for driving the first rotor and a second current component for driving the second rotor. The first current component has a first frequency and the second current component having a second frequency which is different from the first frequency. The composite current flows in each supply line connected to the inverter. The inverter supplies the composite currents so that the first current components flow with the same phases and the second current components flow with different phases from one another in a plurality, N, of supply lines. Here, the second current components deviate at regular phase intervals of $(360/N)°$, thus having a phase difference of $(360/N)°$. The current detection device comprises a current sensor simultaneously detecting the currents in the N supply lines so that the current sensor detects only the first current component having the first frequency. Here, the current sensor does not detect the second current components of the second frequency because the second current components cancel out to zero.

The details as well as other features and advantages of this invention are set forth in the remainder of the specification and are shown in the accompanying drawings.

DESCRIPTION OF THE PREFERRED EMBODIMENTS

Figure 1:
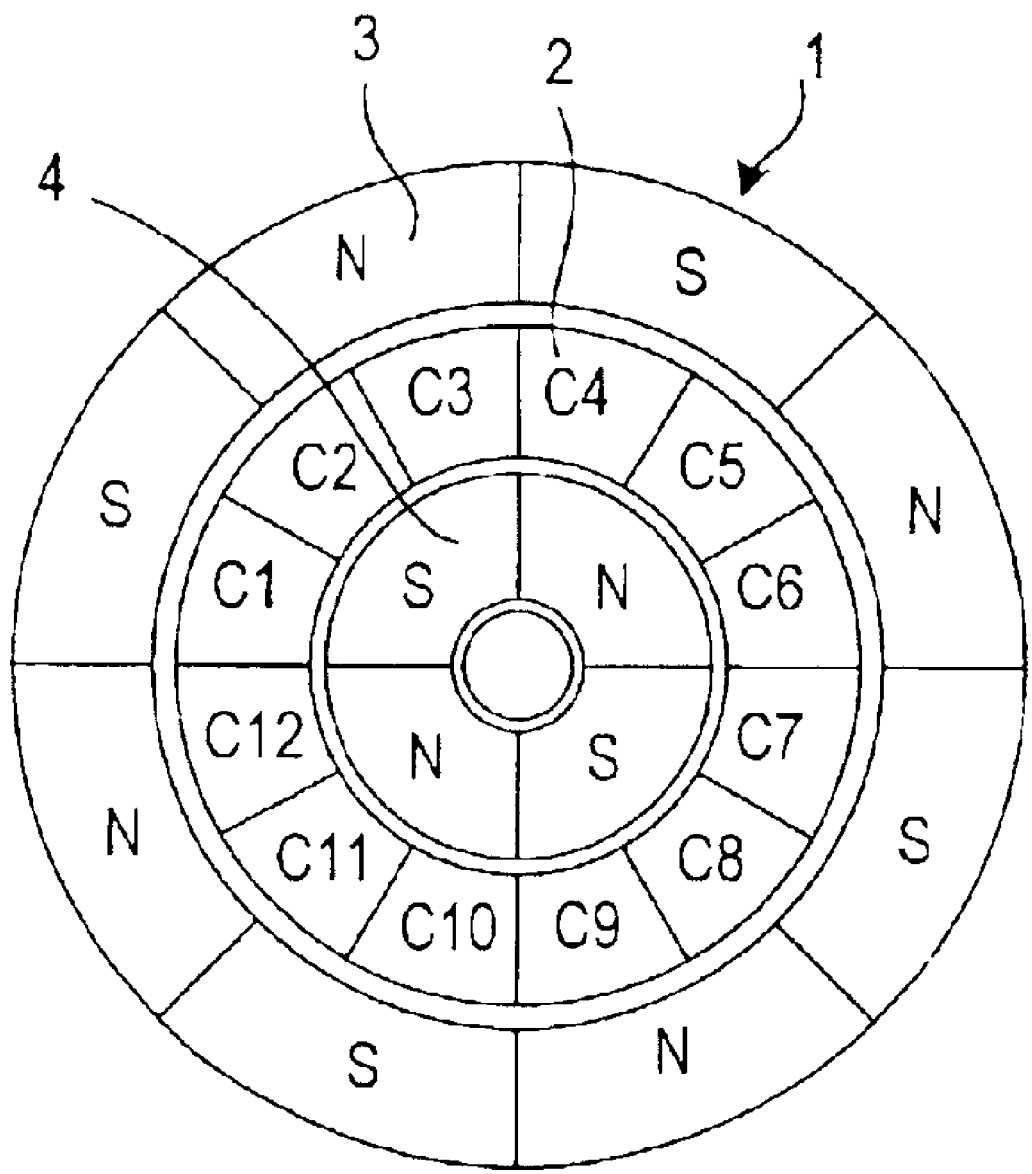
FIG. 1 is a schematic sectional view of a plurality of rotating electric machines which use a common stator according to a first embodiment of this invention.

Referring to FIG. 1, an example of a plurality of rotating electric machines using a common stator according to a first embodiment of this invention will be described. This example has two rotating electric machines. The two rotating electric machines use a common stator 2 and constitute an integrated composite motor 1. Rotors 3, 4 are disposed on the inside and outside of the cylindrical stator 2. The outer rotor 3 and the inner rotor 4 are disposed in a coaxial orientation with respect to the stator 2. The stator 2 and the outer rotor 3 make up one rotating electric machine. The inner rotor 4 and the stator 2 make up the other rotating electric machine.

More precisely, the inner rotor 4 has two pairs of magnetic poles. In the inner rotor 4, the S pole and the N pole are disposed alternately at an interval of 90°. The outer rotor 3 has twice the number of pairs of magnetic poles as the inner rotor 4. In other words, the outer rotor 3 has four N poles and four S poles which are disposed alternately at an interval of 45°.

The stator 2 has a triplet of coils per each magnetic pole of the inner rotor 4 making a total of 12 (=3×4) coils C1–C12 which are disposed at equal angular intervals on the same circular periphery.

A three-phase alternating current (Iu, Iv, Iw) generating a rotating magnetic field for rotating the outer rotor 3 flows in the twelve coils C1–C12. The current components of the three-phase alternating current have a phase difference of $120°$ $(=2\pi/3)$ therebetween, as shown below.

$$Iu = Ic_1 \cos(2\pi F_1 t + \alpha) \tag{1a}$$

$$Iv = Ic_1 \cos(2\pi F_1 t - 2\pi/3 + \alpha) \tag{1b}$$

$$Iw = Ic_1 \cos(2\pi F_1 t - 4\pi/3 + \alpha) \tag{1c}$$

Where:

$Ic_1$: amplitude $F_1$: frequency $\alpha$: initial phase angle

In the same manner, a six-phase alternating current (Ia, Ib, Ic, Id, Ie, If) generating a rotating magnetic field for rotating the inner rotor 4 flows in the twelve coils C1–C12. The current components of the three-phase alternating current have a phase difference of $60°$ $(=\pi/3)$ therebetween, as shown below.

$$Ia = Ic_2 \cos(2\pi F_2 t + \beta) \tag{2a}$$

$$Ib = Ic_2 \cos(2\pi F_2 t - \pi/3 + \beta) \tag{2b}$$

$$Ic = Ic_2 \cos(2\pi F_2 t - 2\pi/3 + \beta) \tag{2c}$$

$$Id = Ic_2 \cos(2\pi F_2 t - \pi + \beta) \tag{2d}$$

$$Ie=Ic_2 \cos(2\pi F_2 t-4\pi/3+\beta) \quad (2e)$$

$$If=Ic_2 \cos(2\pi F_2 t-5\pi/3+\beta) \quad (2f)$$

Where:

$Ic_2$: amplitude $F_2$: frequency $\beta$: initial phase angle

Consequently, when the currents which flow in the coils C1–C12 in order to control the outer rotor (hereafter referred to as "outer-rotor currents") are designated as $I_1 1$–$I_1 12$, these currents are given as shown below using Equation (1).

$$I_1 1=Iu=Ic_1 \cos(2\pi F_1 t+\alpha) \quad (3a)$$

$$I_1 2=Iv=Ic_1 \cos(2\pi F_1 t-2\pi/3+\alpha) \quad (3b)$$

$$I_1 3=Iw=Ic_1 \cos(2\pi F_1 t-4\pi/3+\alpha) \quad (3c)$$

$$I_1 4=Iu=Ic_1 \cos(2\pi F_1 t+\alpha) \quad (3d)$$

$$I_1 5=Iv=Ic_1 \cos(2\pi F_1 t-2\pi/3+\alpha) \quad (3e)$$

$$I_1 6=Iw=Ic_1 \cos(2\pi F_1 t-4\pi/3+\alpha) \quad (3f)$$

$$I_1 7=Iu=Ic_1 \cos(2\pi F_1 t+\alpha) \quad (3g)$$

$$I_1 8=Iv=Ic_1 \cos(2\pi F_1 t-2\pi/3+\alpha) \quad (3h)$$

$$I_1 9=Iw=Ic_1 \cos(2\pi F_1 t-4\pi/3+\alpha) \quad (3i)$$

$$I_1 10=Iu=Ic_1 \cos(2\pi F_1 t+\alpha) \quad (3j)$$

$$I_1 11=Iv=Ic_1 \cos(2\pi F_1 t-2\pi/3+\alpha) \quad (3k)$$

$$I_1 12=Iw=Ic_1 \cos(2\pi F_1 t-4\pi/3+\alpha) \quad (3l)$$

In the same manner, when the currents which flow in the coils C1–C12 in order to control the inner rotor (hereafter referred to as "inner-rotor currents") are designated as $I_2 1$–$I_2 12$, these currents are given as shown below using Equation (2).

$$I_2 1=Ia=Ic_2 \cos(2\pi F_2 t+\beta) \quad (4a)$$

$$I_2 2=Ib=Ic_2 \cos(2\pi F_2 t-\pi/3+\beta) \quad (4b)$$

$$I_2 3=Ic=Ic_2 \cos(2\pi F_2 t-2\pi/3+\beta) \quad (4c)$$

$$I_2 4=Id=Ic_2 \cos(2\pi F_2 t-\pi+\beta) \quad (4d)$$

$$I_2 5=Ie=Ic_2 \cos(2\pi F_2 t-4\pi/3+\beta) \quad (4e)$$

$$I_2 6=If=Ic_2 \cos(2\pi F_2 t-5\pi/3+\beta) \quad (4f)$$

$$I_2 7=Ia=Ic_2 \cos(2\pi F_2 t+\beta) \quad (4g)$$

$$I_2 8=Ib=Ic_2 \cos(2\pi F_2 t-\pi/3+\beta) \quad (4h)$$

$$I_2 9=Ic=Ic_2 \cos(2\pi F_2 t-2\pi/3+\beta) \quad (4i)$$

$$I_2 10=Id=Ic_2 \cos(2\pi F_2 t-\pi+\beta) \quad (4j)$$

$$I_2 11=Ie=Ic_2 \cos(2\pi F_2 t-4\pi/3+\beta) \quad (4k)$$

$$I_2 12=If=Ic_2 \cos(2\pi F_2 t-5\pi/3+\beta) \quad (4l)$$

Since the outer rotor 3 has four pairs of magnetic poles, the following relationship is established between the rotational angular velocity $\omega_1$ of the outer rotor 3 and the frequency $F_1$ of the outer-rotor current.

$$\omega_1=2\pi F_1/4 \quad (5)$$

Since the inner rotor 4 has two pairs of magnetic poles, the following relationship is established between the rotational angular velocity $\omega_2$ of the inner rotor 4 and the frequency $F_2$ of the inner rotor current.

$$\omega_2=2\pi F_2/2 \quad (6)$$

When the composite currents which flow in the coils C1–C12 of the stator 2 are designated as I1–I12, these currents may obviously be expressed as shown below using the current components Iu–Iw from Equation (1) and the current components Ia–If from Equation (2).

$$I1=Iu+Ia \quad (7a)$$

$$I2=Iv+Ib \quad (7b)$$

$$I3=Iw+Ic \quad (7c)$$

$$I4=Iu+Id \quad (7d)$$

$$I5=Iv+Ie \quad (7e)$$

$$I6=Iw+If \quad (7f)$$

$$I7=Iu+Ia \quad (7g)$$

$$I8=Iv+Ib \quad (7h)$$

$$I9=Iw+Ic \quad (7i)$$

$$I10=Iu+Id \quad (7j)$$

$$I11=Iv+Ie \quad (7k)$$

$$I12=Iw+If \quad (7l)$$

Since composite currents I1–I12 are set in this manner, two magnetic fields comprising the rotating magnetic field for rotating the outer rotor 3 and the rotating magnetic field for rotating the inner rotor 4 are simultaneously generated in a single coils unit C1–C12, that is to say, in a single stator. Consequently, the first rotating electric machine comprising the outer rotor 3 and the stator 2 and the second rotating electric machine comprising the inner rotor 4 and the stator 2 are independently controlled. The rotating magnetic field for rotating the outer rotor 3 does not apply a rotational force to the inner rotor 4 and the rotating magnetic field for rotating the inner rotor 4 does not apply a rotational force to the outer rotor 3. The principle for this is disclosed in U.S. Pat. No. 6,049,152.

The setting of the current components Iu, Iv, Iw is performed in synchrony with the rotational phase of the outer rotor 3 and the setting of the current components Ia, Ib, Ic, Id, Ie, If is performed in synchrony with the rotational phase of the inner rotor 4. An advance or delay of the current phase is set with respect to the direction of torque. This is the same as the settings performed in a synchronous motor.

Figure 2:
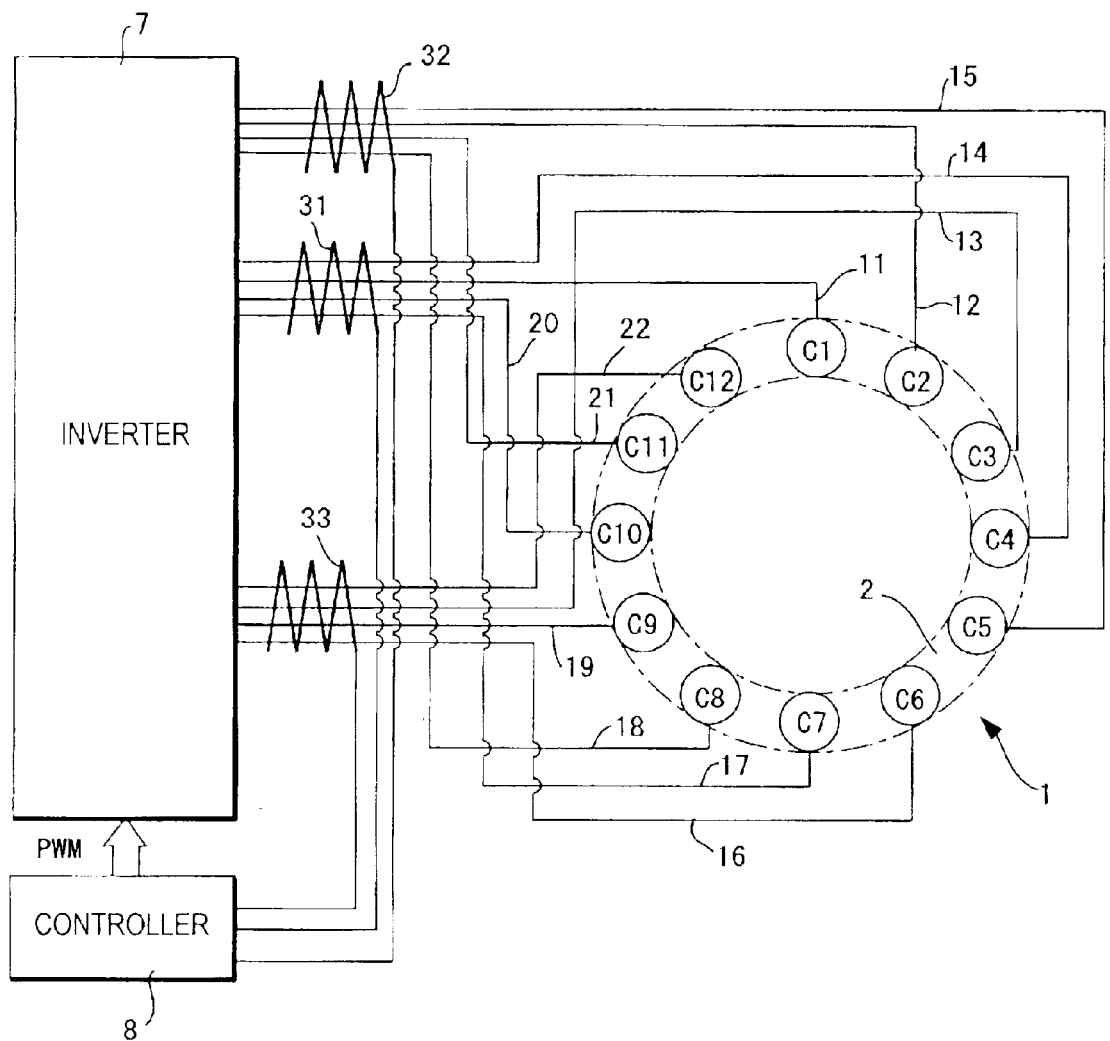
FIG. 2 is a schematic view of a current detection device which detects a current of one rotating electric machine of a plurality of rotating electric machines which use a common stator, according to the first embodiment of this invention.

The controller 8 shown in FIG. 2 is a microcomputer having a central processing unit (CPU), a read only memory (ROM), a random access memory (RAM) and an input/output interface (I/O interface). The controller 8 determines the command values for the d-axis and the q-axis currents for each rotating electric machine and performs a known vector control for each rotating electric machine. On the other hand, the actual values for the d-axis and the q-axis currents are calculated on the basis of the output signal from a rotational angle sensor for the outer rotor and the output signal from a rotational angle sensor for the inner rotor. The controller 8 generates a voltage command value for generating a three-phase current for the first rotating electric machine and a voltage command value for generating a six-phase current for the second rotating electric machine so that the actual d-axis current and the actual q-axis current coincide with the command values. A composite voltage command value is generated by combining the voltage command values for each rotating electric machine. A PWM signal is generated on the basis of the carrier signal and the composite voltage command value. The PWM signal is transmitted to the inverter 7 as shown in FIG. 2 and, FIG. 3.

Twelve composite currents I1–I12 as shown in Equation (7) flow from the inverter 7 through the supply lines 11–22 with respect to the twelve coils C1–C12 of the stator 2.

The composite motor 1 may be combined with the engine. This may be briefly described as directly connecting the outer rotor to the engine output shaft and directly connecting the inner rotor 4 to the drive shaft. The first rotating electric machine is mainly operated as a motor and the second rotating electric machine is mainly operated as a generator. In this case, the controller 8 is provided with the function of determining a target torque for the engine in addition to a target torque for the first rotating electric machine as well as a target torque and a target rotation speed for the second rotating electric machine.

Figure 3:
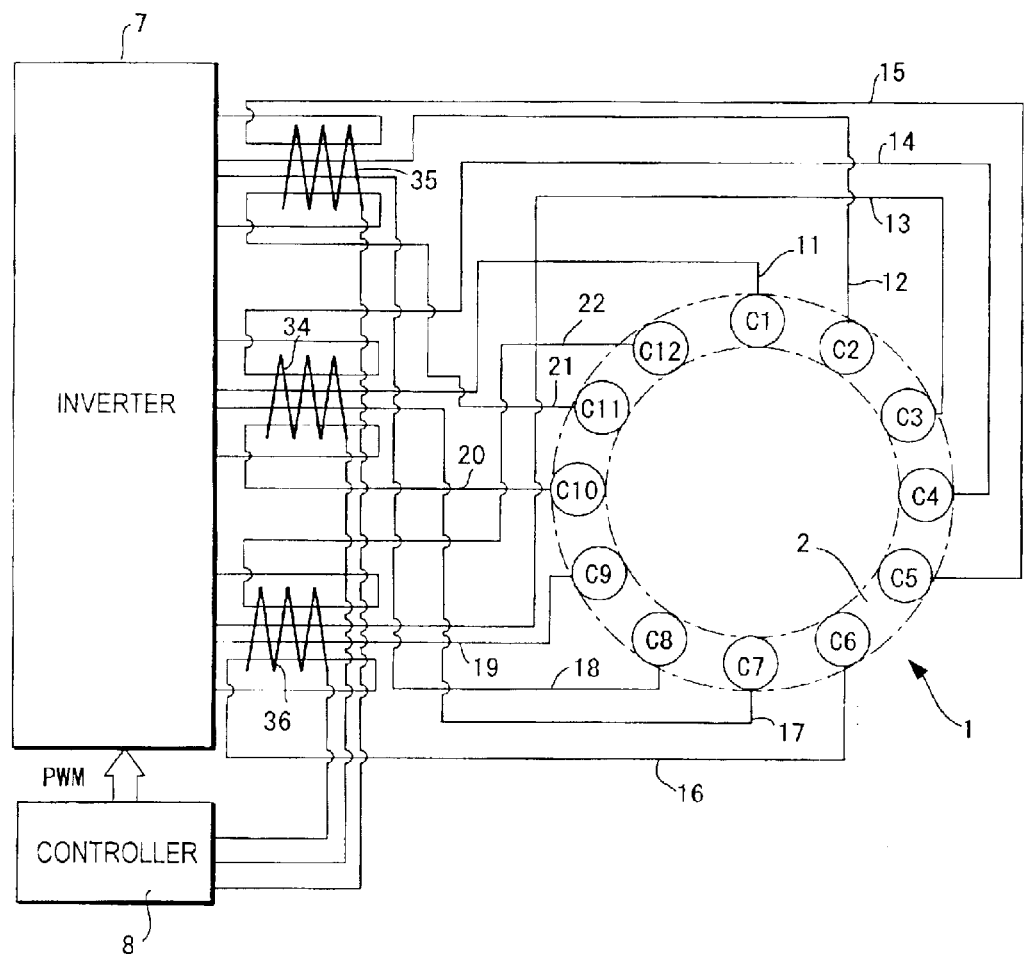
FIG. 3 is similar to FIG. 2, but shows a schematic view of a current detection device detecting a current of another rotating electric machine of a plurality of rotating electric machines which use a common stator, according to the first embodiment of this invention.

Referring to FIG. 2 and FIG. 3, the position of the nine current sensors (only six are shown in FIG. 2 and FIG. 3) for the twelve supply lines 11–22 will be described. The current sensors are preferably through-type current sensors which detect a current based on the magnetic field generated by the current. The current sensor has a function of detecting the sum of the currents provided to the current sensor and is not limited to the through-type current sensor. A through-type current sensor is generally provided with a magnetic core through which the supply line passes. The magnetic field generated in the magnetic core by the current passing in the supply line is detected by a magnetic sensor such as a Hall sensor.

Referring to FIG. 2, when detecting the outer-rotor current, the supply lines 11, 14, 17, 20 to the coils 1, 4, 7, 10 are together led through a single current sensor 31. This current sensor 31 detects a current component Iu for the outer-rotor current. The detected value of the current sensor 31 is as shown below.

$$\text{Detected value of sensor } 31 = I1 + I4 + I7 + I10 \quad (8)$$
$$= (I_1 1 + I_1 4 + I_1 7 + I_1 10) +$$
$$(I_2 1 + I_2 4 + I_2 7 + I_2 10)$$

When Equation (3) and Equation (4) are substituted in the above equation, Equation (9) below is derived. Herein the initial phase angles α, β are normally set to zero.

$$\text{Detected value of sensor } 31 = 4 \times Ic_1 \cos(2\pi F_1 t) + \quad (9)$$
$$\{Ic_2 \cos(2\pi F_2 t) +$$
$$Ic_2 \cos(2\pi F_2 t - \pi) +$$
$$Ic_2 \cos(2\pi F_2 t) +$$
$$Ic_2 \cos(2\pi F_2 t - \pi)\}$$
$$= 4 \times Ic_1 \cos(2\pi F_1 t) = 4 \times Iu$$

Since the terms $Ic_2 \cos(2\pi F_2 t)$ and $Ic_2 \cos(2\pi F_2 t-\pi)$ on the right side of the equation cancel out exactly, the result is obtained that $\{Ic_2 \cos(2\pi F_2 t) + Ic_2 \cos(2\pi F_2 t-\pi)\}$ equals zero. That is to say, when the composite currents I1, I4, I7, I10 are detected together, the inner-rotor currents $I_2 1$, $I_2 4$, $I_2 7$, $I_2 10$ cancel out as a result of the relationship of their respective current phases and do not appear in the detection value of the current sensor 31.

Consequently the current sensor 31 detects only the current component Iu of the outer-rotor current multiplied by the number of pairs of magnetic poles. In this case, the multiple of pole pairs is four.

In the same manner, the supply lines 12, 15, 18, 21 to the coils C2, C5, C8, C11 are collected and pass through the same current sensor 32 as shown in FIG. 2. The supply lines 13, 16, 19, 22 to the coils C3, C6, C9, C12 are collected and pass through the same current sensor 33. In this manner, the remaining current components Iv, Iw for the outer-rotor current are detected as shown below as a multiple of four.

The detected value from the sensor $32 = Ic_1 \cos(2\pi F_1 t - 2\pi/3) = 4 \times (10)$ The detected value from the sensor $33 = 4 \times Ic_1 \cos(2\pi F_1 t - 4\pi/3) = 4 \times Iw$ (11)

In this manner, all current components Iu, Iv, Iw can be determined by the three current sensors 31, 32, 33. The current sensor simultaneously detects the currents flowing in a set of two supply lines, such as (11,14), (17,20), (12,15), (18,21), (13,16), (19,22). In the set of two supply lines, current components, for example Iu, of the frequency $F_1$ flow in phase and current components, for example Ia and Id, of the frequency $F_2$ flow with different phases from one another. The current components of the frequency $F_2$ deviate at a regular phase interval of 180°. Thus, the second current components flow with opposite phases to one another in the set of two supply lines.

Referring to FIG. 3, when the inner-rotor current is detected, the supply lines 11, 17 to the coils C1, C7 are collected with the supply lines 14, 20 to the coils C4, C10 which pass in the opposite direction through the current sensor 34, and applied to a single current sensor 34. If a direction in the supply line from the inverter 7 to the composite motor 1 is taken to be a plus direction, when the supply lines 11, 17 to the coils C1, C7 pass through the current sensor 34 in a plus direction from the inlet of the current sensor 34, the supply lines 14, 20 to the coils C4, C10 pass through the current sensor 34 in a minus direction from the inlet of the current sensor 34. Here the inlet of the current sensor 34 is on the left side of FIG. 3. In this manner, those current detection values generated by the supply lines 14, 20 to the coils C4, C10 have an opposite sign to other current detection values from the current sensor 34. Thus the current sensor 34 detects the 0°-phase current component Ia of the inner-rotor current as shown hereafter.

$$\text{Detected value of sensor } 34 = I1 - I4 + I7 - I10 \quad (12)$$
$$= (I_1 1 - I_1 4 + I_1 7 - I_1 10) +$$
$$(I_2 1 - I_2 4 + I_2 7 - I_2 10)$$

When Equation (3) and Equation (4) are substituted in the above equation, Equation (13) below is derived. Herein the initial phase angles α, β are normally set to zero.

$$\text{Detected value of sensor } 34 = \{Ic_1 \cos(2\pi F_1 t) - \quad (13)$$
$$Ic_1 \cos(2\pi F_1 t) +$$
$$Ic_1 \cos(2\pi F_1 t) -$$
$$Ic_1 \cos(2\pi F_1 t)\} +$$
$$\{Ic_2 \cos(2\pi F_2 t) -$$
$$Ic_2 \cos(2\pi F_2 t - \pi) +$$

-continued $$Ic_2\cos(2\pi F_2 t) -$$
$$Ic_2\cos(2\pi F_2 t - \pi)\}$$
$$= 4 \times Ic_2\cos(2\pi F_2 t) = 4 \times Ia$$

Since $Ic_2 \cos(2\pi F_2 t)$ and $-Ic_2 \cos(2\pi F_2 t-\pi)$ on the right side of the equation are equal ($Ic_2 \cos(2\pi F_2 t) = -Ic_2 \cos(2\pi F_2 t-\pi)$), the current component Ia of the inner-rotor current is detected as a multiple of four. Thus when the composite currents I1, -I4, I7, -I10 are detected together, the outer-rotor currents $I_1 1, I_1 4, I_1 7, I_1 10$ cancel out due to the relationship of the respective current phases and do not appear in the detected value.

In the same manner, referring to FIG. 3, the supply lines 12, 15, 18, 21 to the coils C2, C5, C8, C11 pass together through the current sensor 35. However the supply lines 12, 18 to the coils C2, C8 pass in the opposite direction through the current sensor 35 with respect to the supply lines 15, 21 to the coils C5, C11. Furthermore although the supply lines 13, 16, 19, 22 to the coils C3, C6, C9, C12 pass together through the current sensor 36, the supply lines 13, 19 to the coils C3, C9 pass in the opposite direction through the current sensor 35 with respect to the supply lines 16, 22 to the coils C6, C12. Likewise, although the supply lines 14, 17, 20, 21 to the coils C4, C7, C10, C1 pass together through a current sensor (not shown), the supply lines 14, 20 to the coils C4, C10 pass in the opposite direction through the current sensor with respect to the supply lines 17, 11 to the coils C7, C1. Although the supply lines 15, 18, 21, 12 to the coils C5, C8, C11, C2 pass together through a current sensor (not shown), the supply lines 15, 21 to the coils C5, C11 pass in the opposite direction through the current sensor with respect to the supply lines 18, 12 to the coils C8, C2. Although the supply lines 16, 19, 22, 13 to the coils C6, C9, C12, C3 pass together through a current sensor (not shown), the supply lines 6, 22 to the coils C6, C12 pass in the opposite direction through the current sensor to the supply lines 19, 13 to the coils C9, C3. The current components Ib, Ic, Id, Ie, If are detected as a multiple of four as shown below.

Detected value of sensor $35 = 4 \times Ic_2 \cos(2\pi F_2 t - \pi/3) = 4 \times Ib$ (14)

Detected value of sensor $36 = 4 \times Ic_2 \cos(2\pi F_2 t - 2\pi/3) = 4 \times Ic$ (15)

Detected value of sensor $37 = 4 \times Ic_2 \cos(2\pi F_2 t - \pi) = 4 \times Id$ (16)

Detected value of sensor $38 = 4 \times Ic_2 \cos(2\pi F_2 t - 4\pi/3) = 4 \times Ie$ (17)

Detected value of sensor $39 = 4 \times Ic_2 \cos(2\pi F_2 t - 5\pi/3) = 4 \times If$ (18)

In this manner, all the current components Ia, Ib, Ic, Id, Ie, If of the inner-rotor current are determined by six current sensors.

According to this embodiment, when the outer-rotor current, which has a frequency of $F_1$, is detected, the supply lines are collected and passed through the current sensors 31, 32, 33 so that the phases of the current components of the outer-rotor current of a frequency of $F_1$ are the same and the components of the inner-rotor current of a frequency of $F_2$ cancel out to a value of zero. When the inner-rotor current, which has a frequency of $F_2$, is detected, the supply lines are collected and passed through the current sensors 34, 35, 36 so that the phases of the current components of the inner-rotor current of a frequency of $F_2$ are the same and the components of the outer-rotor current of a frequency of $F_1$ cancel out to a value of zero.

In the first embodiment, the following effects are obtained.

(i) Since current components with respect to one rotating electric machine multiplied by the number of pole pairs is detected rather than a composite current, the SN ratio of the current sensors 31–36 can be improved in this embodiment in comparison to detecting a composite current in which there is a large difference between the average value and the maximum value.

(ii) It is possible to detect the current with little influence from the deviations in the performance of power devices such as an inverter 7 or deviations in the inductance of the supply lines 11–22 and stator coils C1–C12. As a result, the adverse effect of deviations in the inductance of the supply lines 11–22 and the coils C1–C12 is reduced in comparison to detecting a composite current for each supply line 11–22 and subsequently calculating the current components for a single rotating electric machine from the composite current.

(iii) The calculation load on the controller 8 is reduced. In this embodiment, since values of the current components Ia, Ib, Ic, Id, Ie, If of the inner-rotor current and for the current components Iu, Iv, Iw of the outer-rotor current which are multiplied by four (multiple of pole pair number) are detected by the current sensors 31–36, the controller 8 is not required to separate the current components from the composite current.

Figure 4:
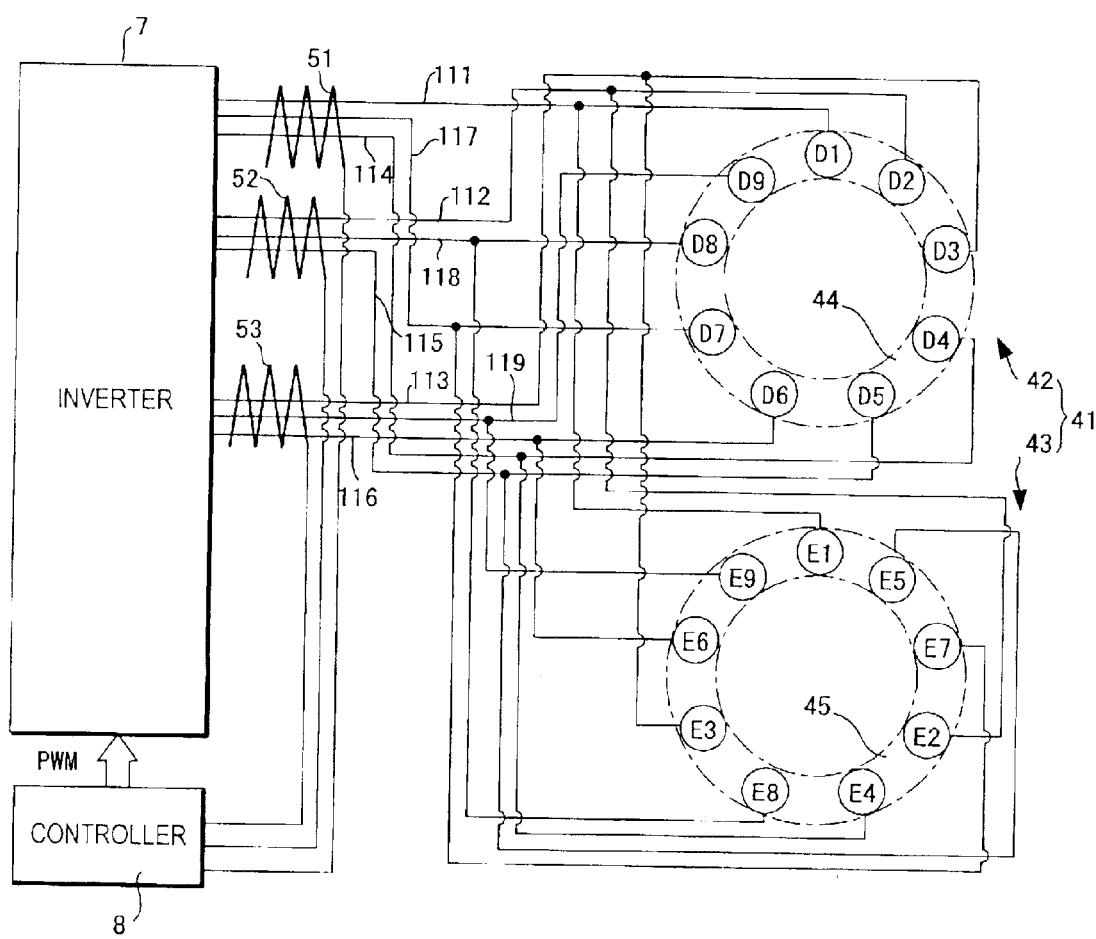
FIG. 4 is a schematic view of a current detection device, detecting a current of one rotating electric machine of a plurality of rotating electric machines which use a common stator, according to a second embodiment of this invention.
Figure 5:
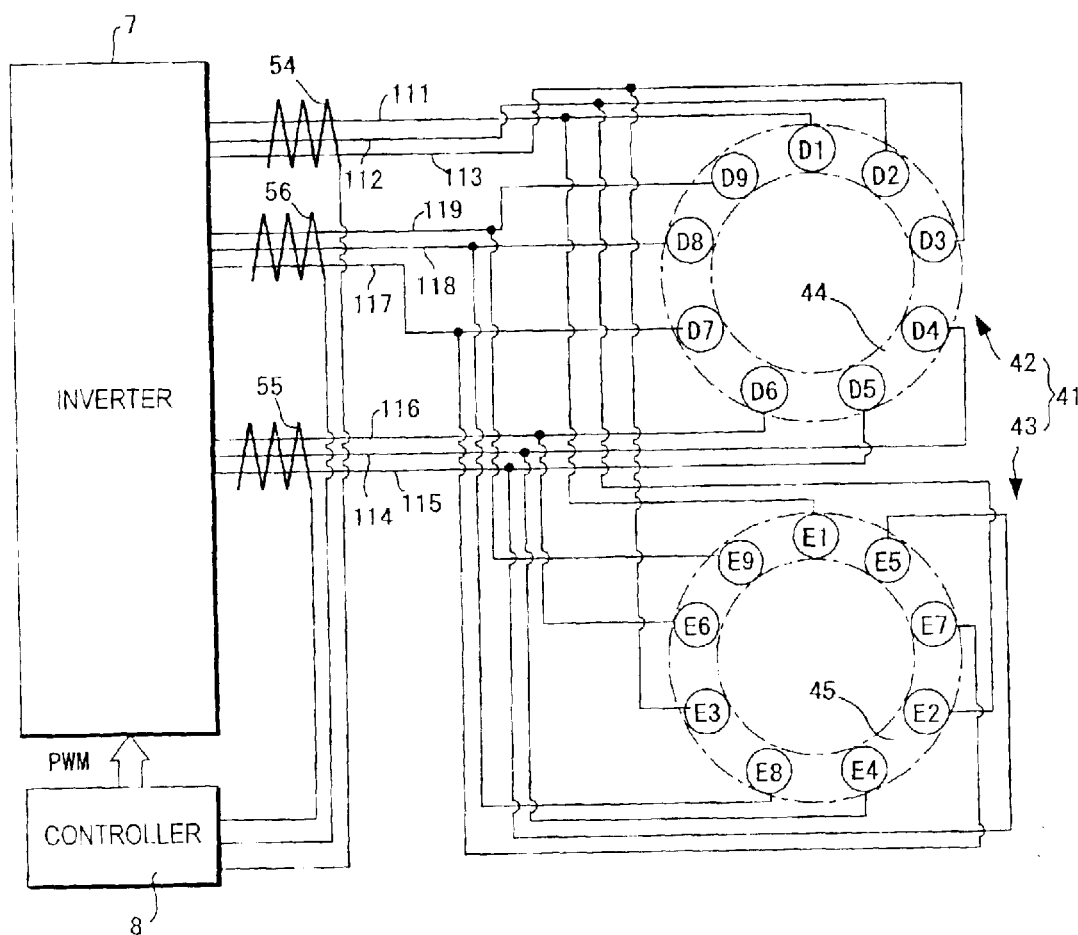
FIG. 5 is similar to FIG. 4, but shows a schematic view of a current detection device detecting a current of another rotating electric machine of a plurality of rotating electric machines which use a common stator, according to the second embodiment of this invention.

Referring to FIG. 4 and FIG. 5, a second embodiment will be described. In the second embodiment, the plurality of rotating electric machines are a first rotating electric machine 42 and a second rotating electric machine 43. These two rotating electric machines do not use a common stator. The number of pole pairs in the rotor of the first rotating electric machine 42 and the rotor of the second rotating electric machine 43 are both three. Hereafter the rotor of the first rotating electric machine 42 is termed the "first rotor" and the rotor of the second rotating electric machine 43 is termed the "second rotor". The stators 44, 45 of each rotating electric machine have three coils per magnetic pole making a total of nine (3×3) coils. The stator 44 of the first rotating electric machine 42 is hereafter termed the "first stator" and the stator 45 of the second rotating electric machine 43 is hereafter termed the "second stator". The rotating magnetic field with respect to the first rotor is generated by a three-phase current (Ip, Iq, Ir) deviating at a phase of 120° ($2\pi/3$) in the three coils as shown below.

$Ip = Ic_3 \cos(2\pi F_3 t + \gamma)$ (19a)

$Iq = Ic_3 \cos(2\pi F_3 t - 2\pi/3 + \gamma)$ (19b)

$Ir = Ic_3 \cos(2\pi F_3 t - 4\pi/3 + \gamma)$ (19c)

Where:
$Ic_3$: amplitude
$F_3$: frequency
$\gamma$: initial phase angle

In the same manner, a three-phase current (Ik, Il, Im) deviating at a phase of 120° ($2\pi/3$) is generated in order to produce a rotating magnetic field for rotating the second rotor as shown below.

$Ik = Ic_4 \cos(2\pi F_4 t + \delta)$ (20a)

$Il = Ic_4 \cos(2\pi F_4 t - 2\pi/3 + \delta)$ (20b)

$Im = Ic_4 \cos(2\pi F_4 t - 4\pi/3 + \delta)$ (20c)

Where:
$Ic_4$: amplitude $F_4$: frequency

δ: initial phase angle

Thus the currents (hereafter termed "first rotor current") controlling the first rotor which flow in each of the nine coils D1–D9 of the first stator 44 are designated as $I_31$–$I_39$, they are given by the following equations.

$$I_31 = I_{c_3} \cos(2\pi F_3 t + \gamma) \quad (21a)$$

$$I_32 = I_{c_3} \cos(2\pi F_3 t - 2\pi/3 + \gamma) \quad (21b)$$

$$I_33 = I_{c_3} \cos(2\pi F_3 t - 4\pi/3 + \gamma) \quad (21c)$$

$$I_34 = I_{c_3} \cos(2\pi F_3 t + \gamma) \quad (21d)$$

$$I_35 = I_{c_3} \cos(2\pi F_3 t - 2\pi/3 + \gamma) \quad (21e)$$

$$I_36 = I_{c_3} \cos(2\pi F_3 t - 4\pi/3 + \gamma) \quad (21f)$$

$$I_37 = I_{c_3} \cos(2\pi F_3 t + \gamma) \quad (21g)$$

$$I_38 = I_{c_3} \cos(2\pi F_3 t - 2\pi/3 + \gamma) \quad (21h)$$

$$I_39 = I_{c_3} \cos(2\pi F_3 t - 4\pi/3 + \gamma) \quad (21i)$$

In the same manner, when the currents (hereafter termed "second rotor current") controlling the second rotor which flow in each of the nine coils E1–E9 of the second stator 45 are designated as $I_41$–$I_49$, they are given by the following equations.

$$I_41 = I_{c_4} \cos(2\pi F_4 t + \delta) \quad (22a)$$

$$I_42 = I_{c_4} \cos(2\pi F_4 t + \delta) \quad (22b)$$

$$I_43 = I_{c_4} \cos(2\pi F_4 t + \delta) \quad (22c)$$

$$I_44 = I_{c_4} \cos(2\pi F_4 t - 2\pi/3 + \delta) \quad (22d)$$

$$I_45 = I_{c_4} \cos(2\pi F_4 t - 2\pi/3 + \delta) \quad (22e)$$

$$I_46 = I_{c_4} \cos(2\pi F_4 t - 2\pi/3 + \delta) \quad (22f)$$

$$I_47 = I_{c_4} \cos(2\pi F_4 t - 4\pi/3 + \delta) \quad (22g)$$

$$I_48 = I_{c_4} \cos(2\pi F_4 t - 4\pi/3 + \delta) \quad (22h)$$

$$I_49 = I_{c_4} \cos(2\pi F_4 t - 4\pi/3 + \delta) \quad (22i)$$

In the case, the following relationship exists between the frequency $F_3$ for the first rotor current and the rotational angular velocity $\omega_3$ of the first rotor.

$$\omega_3 = 2\pi F_3/3 \quad (23)$$

The following relationship exists between the frequency F4 for the second rotor current and the rotational angular velocity $\omega_4$ of the second rotor.

$$\omega_4 = 2\pi F_4/3 \quad (24)$$

When the composite currents are taken to be I1–I9, they may obviously be expressed using the current components Ip–Ir in Equation (19) and the current components Ik–Im in Equation (20).

$$I1 = Ip + Ik \quad (25a)$$

$$I2 = Iq + Ik \quad (25b)$$

$$I3 = Ir + Ik \quad (25c)$$

$$I4 = Ip + Il \quad (25d)$$

$$I5 = Iq + Il \quad (25e)$$

$$I6 = Ir + Il \quad (25f)$$

$$I7 = Ip + Im \quad (25g)$$

$$I8 = Iq + Im \quad (25h)$$

$$I9 = Ir + Im \quad (25i)$$

The composite currents I1–I9 respectively are provided in the supply lines 111–119. However, the three-phase current (Ip, Iq, Ir) does not flow in the stator 45 of the second rotating electric machine 43 and the three-phase current (Ik, Il, Im) does not flow in the stator 44 of the first rotating electric machine 43 because each set of coils (D1, D2, D3) (D4, D5, D6) (D7, D8, D9) (E1, E4, E7) (E2, E5, E8) (E3, E6, E9) forms a three-phase coils unit in which three coils are connected by a star connection.

Six current sensors 51–56 are disposed in the following manner with respect to the total of nine supply lines 111–119. With respect to the first-rotor currents, in order to detect the 0°-phase current component Ip in the first-rotor current, the supply lines 111, 114, 117 to the coils D1, D4, D7 of the first stator 44 and the coils E1, E4, E7 of the second stator 45 are collected and pass through the current sensor 51. The detected value of the current sensor 51 is as follows.

$$\text{Detected value of sensor } 51 = I1 + I4 + I7 \quad (26)$$
$$= (I_31 + I_34 + I_37) +$$
$$(I_41 + I_44 + I_47)$$

Thus when Equation (21) and Equation (22) are substituted into this equation, the following equation is derived. Herein the initial phase angle γ and δ are set to a value of zero.

$$\text{Detected value of sensor } 51 = 3 \times I_{c_3}\cos(2\pi F_3 t) + \quad (27)$$
$$\{I_{c_4}\cos(2\pi F_4 t) +$$
$$I_{c_4}\cos(2\pi F_4 t - 2\pi/3) +$$
$$I_{c_4}\cos(2\pi F_4 t - 4\pi/3)\}$$
$$= 3 \times I_{c_3}\cos(2\pi F_3 t)$$
$$= 3 \times Ip$$

Herein since $\{I_{c_4} \cos(2\pi F_4 t) + I_{c_4} \cos(2\pi F_4 t - 2\pi/3) + I_{c_4} \cos(2\pi F_4 t - 4\pi/3)\} = 0$, the second-rotor currents $I_41$, $I_44$, $I_47$ do not appear in the detected value of the sensor 51. The detected value of the sensor 51 is the current component Ip of the first-rotor current which is multiplied by the number of pole pairs. In this embodiment, the multiple of pole pairs is three.

In the same manner, the supply lines 112, 115, 118 to the coils D2, D5, D8 in the first stator 44 and to the coils E2, E5, E8 in the second stator 45 are collected and pass through the same current sensor 52. The supply lines 113, 116, 119 to the coils D3, D6, D9 in the first stator 44 and to the coils E3, E6, E9 of the second stator 45 are collected and pass through the same current sensor 53. In this manner, the 120°- and 240°-phase current components Iq, Ir of the first-rotor current are detected as a multiple of three as shown below.

$$\text{Detected value of sensor } 52 = 3 \times I_{c_3} \cos(2\pi F_3 t - 2\pi/3) = 3 \times Iq \quad (28)$$

$$\text{Detected value of sensor } 53 = 3 \times I_{c_3} \cos(2\pi F_3 t - 4\pi/3) = 3 \times Ir \quad (29)$$

Thus all the current components Ip, Iq, Ir of the first-rotor current are determined by three current sensors 51–53.

In order to detect the 0°-phase current component Ik of the second-rotor current, the supply lines 111, 112, 113 to the coils D1, D2, D3, in the first stator 44 and to the coils E1, E2, E3, in the second stator 45 are collected and pass through the same current sensor 54.

$$\text{Detected value of sensor } 54 = (I_31 + I_32 + I_33) + (I_41 + I_42 + I_43) \quad (30)$$

Thus when Equation (21) and Equation (22) are substituted into this equation, the following equation is derived. Herein the initial phase angle γ and δ are set to a value of zero.

$$\begin{aligned}\text{Detected value of sensor } 54 &= \{Ic_3\cos(2\pi F_3 t) + \\ &\quad Ic_3\cos(2\pi F_3 t - 2\pi/3) + \\ &\quad Ic_3\cos(2\pi F_3 t - 4\pi/3)\} + \\ &\quad 3 \times Ic_4\cos(2\pi F_4 t) \\ &= 3 \times Ic_4\cos(2\pi F_4 t) \\ &= 3 \times Ik\end{aligned} \quad (31)$$

Herein the first term on the right side of Equation (31) $\{Ic_3\cos(2\pi F_3 t) + Ic_3\cos(2\pi F_3 t - 2\pi/3) + Ic_3\cos(2F_3 t - 4\pi/3)\} = 0$. In other words, the first-rotor currents $I_31, I_34, I_37$ do not appear in the detected value of the sensor 54. This allows the 0°-phase current component Ik of the second-rotor current to be detected.

In the same manner, the supply lines 114, 115, 116 to the coils D4, D5, D6 in the first stator 44 and to the coils E4, E5, E6 in the second stator 45 are collected and pass through the same current sensor 55. The supply lines 117 118, 119 to the coils D7, D8, D9 in the first stator 44 and to the coils E7, E8, E9 of the second stator 45 are collected and pass through the same current sensor 56. In this manner, the 120°- and 240°-phase current components Il, Im of the second-rotor current are detected as a multiple of three.

$$\text{Detected value of sensor } 55 = 3 \times Ic_4 \cos(2\pi F_4 t - 2\pi/3) = 3 \times Il \quad (32)$$

$$\text{Detected value of sensor } 56 = 3 \times Ic_4 \cos(2\pi F_4 t - 4\pi/3) = 3 \times Im \quad (33)$$

Thus all the current components Ik, Il, Im of the second-rotor current are determined by three current sensors 54–56. The current sensor simultaneously detects the currents flowing in a set of three supply lines, such as (111,112,113), (111,114,117). In the set of three supply lines, current components, for example Ip, of the frequency $F_3$ flow in phase and current components, Ik, Il, Im, of the frequency $F_4$ flow with different phases from one another. The three current components of the frequency $F_4$ deviate at regular phase intervals of 120°. Thus, the current components of the frequency $F_4$ cancel out to zero in the set of supply lines.

The operation and effect of the second embodiment are the same as that described referring to the first embodiment.

When a current sensor which should detect only a current component at one frequency detects the current components at other frequencies, it is determined that the coil where a current component with the other frequency flows has become disconnected. For example, when a current component with a frequency $F_4$ is intermingled in a sensor which should only detect a current component with a frequency $F_3$, it is determined that the coil where a current component with a frequency $F_4$ flows has become disconnected.

This is described precisely as follows. In order to detect the current component Ip of the first-rotor current, the supply lines 111, 114, 117 to the coils D1, D4, D7 in the first stator 44 and to the coils E1, E4, E7 in the second stator 45 are collected and pass through the same current sensor 51. The fact that a current component with a frequency $F_4$ is detected by the current sensor 51 indicates that one of the coils E1, E4, E7 of the second stator 45 has become disconnected.

In this situation, the above equation takes the following form.

$$\text{Detected value of sensor } 51 = 3 \times Ic_3 \cos(2\pi F_3 t) + \Delta I \quad (34)$$

Where ΔI is as follows.
When the coil E1 is disconnected:

$$\Delta I = Ic_4 \cos(2\pi F_4 t - 2\pi/3) + Ic_4 \cos(2\pi F_4 t - 4\pi/3) \quad (35a)$$

When the coil E4 is disconnected:

$$\Delta I = Ic_4 \cos(2\pi F_4 t) + Ic_4 \cos(2\pi F_4 t - 4\pi/3) \quad (35b)$$

When the coil E7 is disconnected:

$$\Delta I = Ic_4 \cos(2\pi F_4 t) + Ic_4 \cos(2\pi F_4 t - 2\pi/3) \quad (35c)$$

ΔI in Equation (34) above is a function of the frequency F4. When the current characteristics after a d–q conversion of the detected value of the current sensor 51 are considered, the actual d-current and the actual q-current take an oscillating waveform when a disconnection in one of the coils E1, E4, E7 in the second stator 45 has occurred. When a disconnection in one of the coils E1, E4, E7 in the second stator 45 has not occurred, the actual d-current and the actual q-current display substantially fixed characteristics. Also, when a disconnection has occurred in any two of the coils E1, E4, E7 in the second stator 45, as described above, the actual d-current and the actual q-current take an oscillating waveform. Thus if an oscillation results in the actual d-current and the actual q-current obtained from the detection value of the current sensor 51, it is determined that a disconnection has occurred in one or two of the coils E1, E4, E7 in the second stator 45.

In the two embodiments above, in order to detect current components at a first frequency (in the first embodiment, F1 and in the second embodiment $F_3$), the supply lines are collected and passed through the same current sensor so that the phase of the current components of the first frequency ($F_1$, $F_3$) is the same and the current components of the second frequency (in the first embodiment $F_2$, in the second embodiment $F_4$) cancel out to a value of zero. Furthermore in order to detect current components at a second frequency ($F_2$, $F_4$), the supply lines are collected and passed through the same current sensor so that the phase of the current components of the second frequency ($F_2$, $F_4$) is the same and the current components of the first frequency ($F_1$, $F_3$) cancel out to a value of zero.

In the two embodiments above, the number of supply lines has been described taking a maximum number (four lines in the first embodiment and three lines in the second embodiment) as an example. However the invention is not limited in this regard.

For example, in the first embodiment, only two supply lines may be collected. To described this point in further detail, in order to detect the 0°-phase, current component Iu of the outer-rotor current, the supply lines 11, 14 to the coils C1, C4 or the supply lines 17, 20 to the coils C7, C10 are collected into a single set of two supply lines and pass through the same current sensor 31.

The detected values of the current sensor 31 at this time are as shown below.

$$\text{Detected value of sensor } 31 = I1 + I4 = (I_1 1 + I_1 4) + (I_2 1 + I_2 4) \quad (36)$$

or $$= I7 + I10 = (I_1 7 + I_1 10) + (I_2 7 + I_2 10) \quad (37)$$

Herein the initial phase angles α, β are set to a value of zero. When Equation (3) and Equation (4) are substituted into the above equation, the following equation is derived.

$$\text{Detected value of sensor } 31 = 2 \times Ic_1 \cos(2\pi F_1 t) + \{Ic_2 \cos(2\pi F_2 t) + Ic_2 \cos(2\pi F_2 t - \pi)\} = 2 \times Ic_1 \cos(2\pi F_1 t) = 2 \times Iu \quad (38)$$

Herein the right-side expressions $Ic_2 \cos(2\pi F_2 t)$ and $Ic_2 \cos(2\pi F_2 t - \pi)$ exactly cancel out and $Ic_2 \cos(2\pi F_2 t) + Ic_2 \cos(2\pi F_2 t - \pi) = 0$. In other words, when detecting the composite current I1 and I4 or I7 and I10 together, the inner-rotor currents $I_2 1$ and $I_2 4$, or $I_2 7$ and $I_2 10$ do not appear in the detected value from the current sensor 31. Thus the detected value from the current sensor 31 coincides with the product of half the number of pole pairs of the current component Iu of the outer-rotor current. Half the number of pole pairs in this instance is two.

In the same manner, the supply lines 12 and 15 to the coils C2 and C5 or the supply lines, 18 and 21 to the coils C8 and C11 are collected and pass through the same current sensor 32. The supply lines 13 and 16 to the coils C3 and C6 or the supply lines 19 and 22 to the coils C9 and C12 are collected and pass through the same current sensor 33. In this manner, the 120°- and 240°-phase current components Iv, Iw of the outer-rotor current are detected as a multiple of two.

$$\text{Detected value of sensor } 32 = 2 \times Ic_1 \cos(2\pi F_1 t - 2\pi/3) = 2 \times Iv \quad (39)$$

$$\text{Detected value of sensor } 33 = 2 \times Ic_1 \cos(2\pi F_1 t - 4\pi/3) = 2 \times Iw \quad (40)$$

Thus all the current components Iu, Iv, Iw of the outer-rotor current can be determined by three current sensors 31–33. The detection of the inner-rotor current is performed in a like manner.

The advantages and disadvantages of using two collected supply lines in comparison to the first embodiment where a maximum number of four collected supply lines were used are as follows.

(i) When two supply lines are collected, the adverse effect of deviations in the inductance of the coils or the wiring increases. In contrast, when a maximum of four supply lines are collected, deviations in the inductance of the coils or wiring have little effect on the detected value of the current sensor 32. This is because, even when the deviation in two supply lines is large, the deviation in the remaining two supply lines can be small.

(ii) When a maximum of four supply lines are collected, the controller 8 is not required to make the detected value of the sensor 32 a multiple of the number of pole pairs. However when two collected supply lines are used, the controller 8 is required to double the detected value of the current sensor 32.

Although the embodiments of this invention have been described with respect to providing a current sensor in the supply line, the invention is not limited in this respect and it is possible to provide a sensor in proximity to the neutral point of the coils.

The entire contents of Japanese Patent Application P2001-207633 (filed Jul. 9, 2001) are incorporated herein by reference.

Although the invention has been described above by reference to certain embodiments of the invention, the invention is not limited to the embodiments described above.

Modifications and variations of the embodiments described above will occur to those skilled in the art, in light of the above teachings. The scope of the invention is defined with reference to the following claims.

What is claimed is:

1. A current detection device for use in an electric rotating system; the system having a first rotor, a second rotor, and a single inverter for supplying a composite current which is a combination of a first current component for driving the first rotor and a second current component for driving the second rotor;

the first current component having a first frequency and the second current component having a second frequency which is different from the first frequency;

the inverter supplying the composite current to a plurality, N, of supply lines so that the first current components flow with the same phases and the second current components flow with different phases from one another, the second current components deviating at regular phase intervals of (360/N)°;

the current detection device comprising:

a current sensor simultaneously detecting the currents in the supply lines so that the current sensor detects only the first current component having the first frequency.

2. The current detection device as defined in claim 1, wherein the current sensor detects the currents in the supply lines, the supply lines being collected and passing through the current sensor so that the second current components of the second frequency cancel out to zero in the supply lines.

3. The current detection device as defined in claim 1, wherein the current sensor detects the currents in the supply lines where the number, N, of the supply lines is two and the second current components flow with opposite phases to one another in the two supply lines.

4. The current detection device as defined in claim 1, wherein the current sensor detects the currents in the supply lines where the number, N, of the supply lines is three and the second current components flow with different phases deviating at regular phase intervals of 120° in the three supply lines.

5. The current detection device as defined in claim 1, wherein the current sensor detects the currents in a possible maximum number of supply lines.

6. The current detection device as defined in claim 1, wherein the current sensor detects the sum of the currents provided to the current sensor.

7. The current detection device for use in an electric rotating system as defined in claim 1, wherein the electric rotating system comprises a first rotating machine provided with the first rotor and a second rotating machine provided with the second rotor.

8. The current detection device for use in an electric rotating system as defined in claim 1, wherein the electric rotating system comprises a rotating machine provided with a stator, the first rotor disposed on the inside of the stator and the second rotor disposed on the outside of the stator.

9. A current detecting method for use in an electric rotating system; the system having a first rotor, a second rotor, and a single inverter for supplying a composite current which is a combination of a first current component for driving the first rotor and a second current component for driving the second rotor;

the first current component having a first frequency and the second current component having a second frequency which is different from the first frequency;

the inverter supplying the composite current to a plurality, N, of supply lines so that the first current components flow with the same phases and the second current components flow with different phases from one another, the second current components deviating at regular phase intervals of $(360/N)°$;

the current detecting method comprising:

detecting simultaneously the currents in the supply lines so as to detect only the first current component having the first frequency.

* * * * *